United States Patent
Pulnikov

(10) Patent No.: US 10,830,249 B2
(45) Date of Patent: Nov. 10, 2020

(54) SHROUDED IMPELLER MADE BY ADDITIVE MANUFACTURING AND INCLUDING VOIDS IN THE HUB AND IN THE SHROUD

(71) Applicant: ATLAS COPCO AIRPOWER, NAAMLOZE VENNOOTSCHAP, Wilrijk (BE)

(72) Inventor: Aleksandr Pulnikov, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 23 days.

(21) Appl. No.: 15/780,473

(22) PCT Filed: Nov. 29, 2016

(86) PCT No.: PCT/BE2016/000051
§ 371 (c)(1),
(2) Date: May 31, 2018

(87) PCT Pub. No.: WO2017/096440
PCT Pub. Date: Jun. 15, 2017

(65) Prior Publication Data
US 2018/0355883 A1      Dec. 13, 2018

Related U.S. Application Data

(60) Provisional application No. 62/264,998, filed on Dec. 9, 2015.

(30) Foreign Application Priority Data

Mar. 1, 2016    (BE) .................................... 2016/5148

(51) Int. Cl.
*F04D 29/28* (2006.01)
*F04D 29/02* (2006.01)
(Continued)

(52) U.S. Cl.
CPC ............ *F04D 29/284* (2013.01); *B22F 3/008* (2013.01); *B22F 5/009* (2013.01); *B22F 5/04* (2013.01);
(Continued)

(58) Field of Classification Search
CPC ..... F04D 29/284; F04D 29/023; B33Y 10/00; B33Y 80/00; B22F 3/008
(Continued)

(56) References Cited

U.S. PATENT DOCUMENTS

| 7,281,901 B2 * | 10/2007 | Garman | B22F 3/105 416/233 |
| 2015/0267543 A1 * | 9/2015 | Gerber | B22F 5/009 416/212 R |
| 2017/0225252 A1 * | 8/2017 | Illston | B33Y 10/00 |

FOREIGN PATENT DOCUMENTS

| CN | 104343747 A | 2/2015 |
| WO | 2013124314 A1 | 8/2013 |

OTHER PUBLICATIONS

Chinese Office Action in corresponding Chinese Application No. 201680071922.9, dated Apr. 26, 2019.
(Continued)

*Primary Examiner* — Aaron R Eastman
(74) *Attorney, Agent, or Firm* — Bacon & Thomas, PLLC

(57) ABSTRACT

A method for manufacturing closed impellers with internal cavities. Impellers that are manufactured according to the method have a smaller mass and enable a higher operating efficiency to be attained.

12 Claims, 2 Drawing Sheets

(51) Int. Cl.
- *B22F 5/04* (2006.01)
- *B33Y 80/00* (2015.01)
- *B22F 5/00* (2006.01)
- *B33Y 10/00* (2015.01)
- *B22F 3/00* (2006.01)
- *B22F 3/105* (2006.01)

(52) U.S. Cl.
CPC .............. *B33Y 10/00* (2014.12); *B33Y 80/00* (2014.12); *F04D 29/023* (2013.01); *B22F 3/1055* (2013.01); *F05D 2230/22* (2013.01); *F05D 2230/31* (2013.01); *Y02P 10/25* (2015.11)

(58) Field of Classification Search
USPC ...................................................... 416/186 R
See application file for complete search history.

(56) References Cited

OTHER PUBLICATIONS

International Search Report in PCT/BE2016/000051, dated Apr. 21, 2017.

\* cited by examiner

SHROUDED IMPELLER MADE BY ADDITIVE MANUFACTURING AND INCLUDING VOIDS IN THE HUB AND IN THE SHROUD

The invention concerns a method for manufacturing a closed impeller.

BACKGROUND OF THE INVENTION

Centrifugal impellers are used in turbocompressors for compressing gases. Such turbocompressors generally comprise a number of compression stages, each with a compressor element to increase the pressure incrementally, whereby the last stage reaches the highest pressure.

'Closed impellers' consist of a hub with blades and a shroud that covers the blades. Conventionally, such impellers are either made from a solid piece of metal whereby material is removed by turning and milling, or they are produced by joining a pre-processed hub and a pre-processed shroud by welding or brazing.

The hub comprises a central bore for connecting the impeller to a drive shaft. In order to prevent excessive leakage of gas at the outlet pressure into the inlet of the impeller, a front seal is usually provided on the shroud. The shroud contains a number of steps on its outer surface that define seats for seals. Preferably the seats have a cylindrical surface, as it enables an axial displacement of the impeller, for example due to centrifugal shrinkage and/or thermal expansion of the impeller and the drive shaft.

Another seal could optionally be fitted at the back of the impeller, i.e. on the axial side of the outlet.

During operation, gas flows into the channels of the impeller via the inlet at an inlet pressure and leaves the channels via the outlet at an outlet pressure. Consequently the outlet pressure is present over the shroud and at the back of the hub. As the pressure in the channels is lower than the outlet pressure, this ensures a compression of the blades. As this compression affects the size of the blades, and as a smaller cross-section of the blades is desired, it would be preferable for a method to be found to reduce this operational compression.

The impeller is subject to centrifugal forces during operation. As the shroud is on top of the blades, the deformation of the shroud is greater than the deformation of the hub. This results in an additional load on the blades. This is why it would be preferable to reduce the mass of the shroud. A lower mass of the shroud would enable thinner blades, which in turn would enable a reduced mass of the hub. Consequently the total weight of the impeller could be reduced.

Additive manufacturing techniques could enable impeller structures that would otherwise be unattainable with conventional subtractive manufacturing techniques.

An application of additive manufacturing techniques is presented in U.S. Pat. No. 7,281,901 for realizing internal cavities in open impellers. It is proposed making such impellers using selective laser melting techniques or SLM, which is based on the deposition of layers of fine metal powder and the local melting of this powder in order to obtain a desired cross-section of the component. When the impeller is ready, the surplus powder is removed from the internal cavities via passages that connect the internal cavities to a central bore of the open impeller.

For superchargers, to which U.S. Pat. No. 7,281,901 relates, such an arrangement could be sufficient, as the inlet pressure for such impellers is generally atmospheric pressure. However, this solution is not suitable for high pressure applications. Such an impeller is generally assembled at atmospheric pressure. But during operation with a high inlet pressure, gas could gradually leak into the internal cavities through the central bore. This creates an uncertain pressure in the internal cavity and constitutes a potential hazard when the impeller is dismantled.

SUMMARY OF THE INVENTION

The purpose of the present invention is to provide a solution for one or more of the above and/or other problems.

To this end, the invention relates to a method for manufacturing a closed impeller with a hub and a shroud by means of additive manufacturing, whereby this method comprises the step of providing one or more internal cavities in the hub and/or the shroud through additive manufacturing.

The invention further relates to a closed impeller comprising:
a hub;
a set of blades provided on said hub;
a shroud provided above these blades, wherein said hub is provided with a part with a first internal cavity, whereby this first cavity is in fluid communication with a back part of the impeller, or with an inlet of the impeller, or with an arbitrary location in the impeller channels that extend between the blades.

According to a preferred embodiment of an impeller according to the invention, the shroud is provided with a second internal cavity, whereby the second internal cavity is in fluid communication with the inlet of the impeller. As such the second internal cavity is subject to the inlet pressure of the impeller. Preferably the second cavity is provided in a low part of the shroud.

BRIEF DESCRIPTION OF THE DRAWINGS

With the intention of better showing the characteristics of the invention, a few preferred embodiments and methods for implementing the invention are described hereinafter without any limiting nature, with reference to the accompanying drawings, wherein.

DETAILED DESCRIPTION OF THE INVENTION

Figure 1:
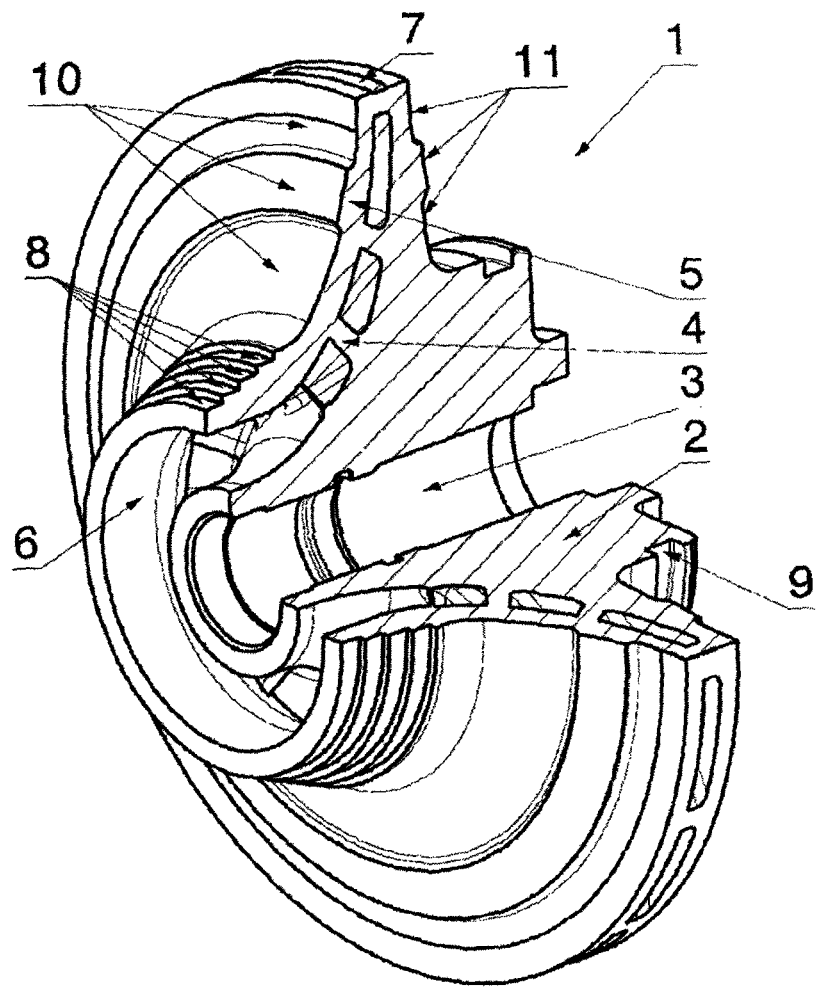
FIG. 1 schematically shows a conventional configuration of a closed impeller according to the state of the art.

A conventional configuration of a closed impeller according to the state of the art is shown in FIG. 1.

The impeller 1 comprises a hub 2 with a central bore 3, a set of blades 4 provided on the hub 2 and a shroud 5 on top of the blades that covers the channels between the blades 4.

Furthermore, the impeller 1 shows an inlet 6 and an outlet 7.

A set of cylindrical surfaces 8 is provided for the front seal on the front part of the shroud 5, i.e. the side of the shroud 5 on the inlet side facing away from the hub 2.

A sealing surface 9 for the back seal could be optionally provided at the back of the impeller 1. The outer surface 10 of the shroud 5, as well as the outer surface 11 of the hub 2, are subject to the outlet pressure of the impeller 1 when the impeller 1 is in use.

During operation, when the impeller is rotationally driven in a known way to compress a gas, the pressure in the channels between the blades 4 varies from the inlet pressure at the inlet 6 to the outlet pressure at the outlet 7.

As the pressure in the channels of the impeller 1 is generally lower than the outlet pressure, the blades 4 are subject to compression that acts on the surfaces 10 and 11. The thickness of the blades 4 must be sufficient in order to prevent excessive mechanical stress.

Cylindrical surfaces 8 facilitate the sealing, as they enable an axial displacement of the impeller 1 with respect to the corresponding static sealing rings (not shown in the drawing) due to centrifugal axial shrinkage and/or thermal expansion of the drive train in operation. In order to prevent excessive leakage through the front seal, a set of sealing rings is often used. Due to the centrifugal deformation of the impeller 1, it is impractical to use a single cylindrical surface. Instead of this, a set of short cylindrical surfaces 8 with different diameters is applied. This generally leads to an excessive thickness of the shroud 5 at the inlet 6.

The application of additive manufacturing techniques for the production of the impeller enables the impeller structure to be optimised for the purpose of reducing the impeller weight and lowering the manufacturing costs, as well as improving the operation of the impeller.

Additive manufacturing techniques also enable substantial freedom of design. For example, they allow internal cavities and internal channels to be made in the impeller.

Figure 2:
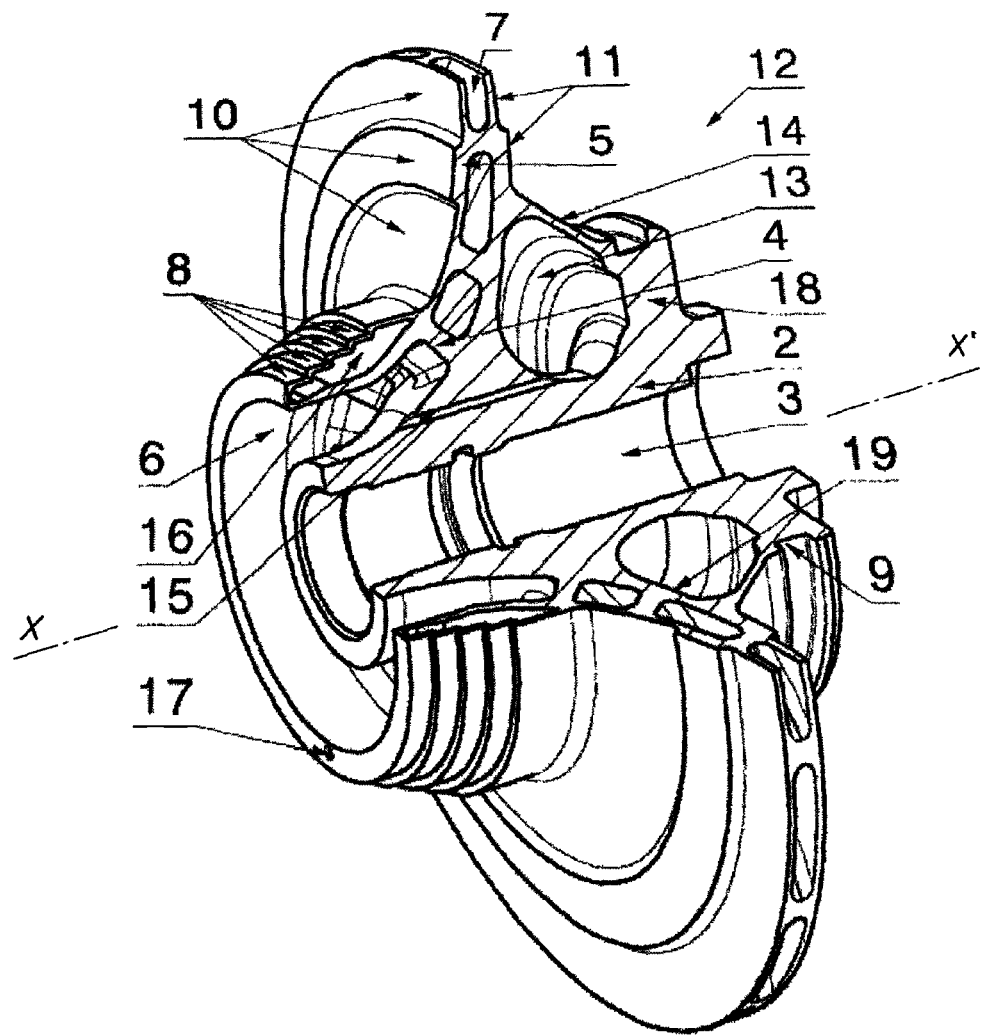
FIG. 2 schematically shows a closed impeller according to the present invention.

A configuration of an impeller 12 according to the invention, whereby the impeller 12 incorporates such design characteristics, is presented in FIG. 2.

In addition to the elements indicated in the impeller 1 according to the state of the art, the impeller 12 according to the invention comprises a first internal cavity 13 in the hub 2.

The top wall 14 covering the cavity 13 is manufactured with an angle with respect to the axis X-X' of the impeller 1. This angle depends on the selected manufacturing technique and the direction in which the impeller 12 is constructed. If an SLM technique is chosen, the preferred construction direction would be from the inlet 6 to the back of the impeller 12. In such a case, the maximum value of the angle between the top wall 14 and the impeller 1 axis (X-X') should not exceed the maximum angle allowed by SLM for unsupported surfaces, which is currently about 45°. Due to this restriction, a support lattice could be introduced into the impeller channels, however whereby this lattice could be removed at a later stage.

The first internal cavity 13 is in fluid communication with the inlet 6, in this case through a number of channels 15.

According to a preferred characteristic according to the invention, an additional, second internal cavity 16 is provided in the front part of the shroud 5. This second internal cavity 16 is in fluid communication with the inlet 6, in this case via a set of channels 17. The second internal cavity 16 ensures some mass reduction in the shroud 5 and additionally decouples the centrifugal deformation of the sealing surfaces 8 from the deformation of the rest of the shroud 5. This enables a more radial deformation of the sealing surfaces and consequently a better sealing quality.

In this example, the channels 15 and 17 are both used as evacuation channels for the removal of unmelted metal powder, and as pressure equalisation channels to provide a corresponding pressure in the first and second internal cavities 13 and 16. Naturally, according to another embodiment (not shown in the drawings), separate channels could be provided that are intended either for the evacuation or for the pressure equalisation.

The location of the channels 15 enables a manipulation of the internal pressure in the first internal cavity 13. For example, the channels 15 could be located at a larger radius, i.e. closer to the outlet 7, in order to provide a higher gas pressure in the first internal cavity 13. This would reduce the pressure across the top wall 14.

It is also possible to make the channels 15 in the back wall 18. In such a case the pressure in the first internal cavity 13 would be equal to the back pressure available behind the back seal.

It is also possible to completely seal off the channels 15 after the metal powder has been removed from the first cavity 13. As the outer pressure is applied to the surface of the top wall 14, it is possible to at least partially offset the effect of the centrifugal forces acting on the hub 2.

The outlet pressure is applied to the outer surfaces 10 and 11. However, the compression of the blades 4 in the impeller 12 according to the invention would be substantially lower compared to the impeller 1 according to the state of the art.

As the wall 14 is sloping with respect to the axis X-X' of the impeller 12, this reduces the area of the outer surface 11. Indeed, as the pressure in the first internal cavity 13 is lower compared to the pressure in the channels between the blades 4, this would further reduce the compression of the blades 4. The thickness of the blades 4 is generally determined by the centrifugal load and compression during operation due to the pressure build-up from the inlet to the outlet. If the operational compression decreases, this provides a possibility for decreasing the thickness of the blades. Smaller blade 4 thickness would have a positive effect on the performance of the impeller 12, as the cross-section of the channels between the blades 4 would increase, and thus would enable a reduction of mass in the hub 2.

A reduction of mass in the shroud 5 and in the blades 4 does not necessarily lead to a corresponding weakening of the hub 2. Instead of this, higher tip speeds could be attained with a similar impeller configuration.

Due to the sloping top wall 14, the back surface of the impeller 12 according to the invention that is exposed to the outlet pressure is also reduced compared to the impeller 1 according to the state of the art. This would reduce the friction losses. In order to prevent gas circulating in the first and/or second internal cavities 13 and/or 16, a set of membranes could be introduced that separate the cavities 13 and/or 16 into different chambers. In such a case every chamber must be provided with a separate channel 15 and 17.

The outer surface of the impeller 12 could be treated in order to obtain a smooth surface.

The proposed structure could also be extended to impellers of the open type operating at high pressures and which are not provided with a shroud around the blades.

Additive manufacturing is a process in which materials are joined to make objects from 3D model data, usually layer by layer, as opposed to subtractive manufacturing techniques (ASTM F2792-12a).

Additive manufacturing refers to a category of manufacturing methods, for example powder bed fusion (an additive manufacturing process in which thermal energy selectively melts specific regions of a powder bed) and direct energy deposition (an additive manufacturing process in which focused thermal energy is used to melt materials as they are being deposited). Within the powder bed fusion method, there are a number of technologies such as electron beam melting (powder material is melted using an electron beam), selective laser melting (SLM, a production process in which powder material is melted using a laser), selective laser sintering (powder material is sintered using a laser). Direct energy deposition also includes laser cladding technology.

Metal, ceramics, polymer or fibre-reinforced polymer, or any combination of these materials, could be utilised for manufacturing impellers of the proposed configuration.

The invention is not limited to the embodiments and methods described above, but an impeller according to the invention can be realised in different shapes and sizes and, likewise, a method according to the present invention for manufacturing an impeller can be realised in all kinds of variants, without departing from the scope of the invention.

The invention claimed is:

1. A closed turbocompressor impeller, said closed turbocompressor impeller comprising:
    a hub having an outer surface comprising a top portion and a bottom portion;
    a set of blades provided on said hub;
    a shroud provided on top of the blades; and
    a sealing surface for a back seal provided at a back side of the closed turbocompressor impeller,
    wherein said hub is provided with a part with a first internal cavity, wherein said first internal cavity is in fluid communication with a back part of the impeller, or with an inlet of the impeller, or with an arbitrary location in the impeller channels that extend between the blades, wherein said first internal cavity has a sloping top wall with respect to a central axis of the impeller, said sloping top wall forming the bottom portion of the outer surface of the hub and extends from the top portion towards the sealing surface at the back side of the closed turbocompressor impeller, wherein said top portion and the bottom portion of the outer surface of the hub are configured to be exposed to the outlet pressure during operation, and
    wherein the shroud comprises a second internal cavity, and wherein the second internal cavity is in fluid communication with the inlet of the impeller.

2. The closed turbocompressor impeller according to claim 1, wherein the second internal cavity is provided in a front part of the shroud at the inlet.

3. The closed turbocompressor impeller according to claim 1, wherein the impeller is further provided with channels that are designed such that they enable the removal of unmelted metal powder.

4. The closed turbocompressor impeller according to claim 1, wherein the impeller is further provided with pressure equalization channels that are designed such that they provide a corresponding pressure in the first and second internal cavity.

5. The closed turbocompressor impeller according to claim 1, wherein the impeller is made by means of one or more additive manufacturing techniques.

6. The closed turbocompressor impeller according to claim 5, wherein the impeller is made of metal.

7. The closed turbocompressor impeller according to claim 5, wherein the impeller is made as a single component.

8. The closed turbocompressor impeller according to claim 1, wherein a maximum value of an angle between the sloping top wall and the central axis of the impeller is 45°.

9. The closed turbocompressor impeller according to claim 1, wherein said first internal cavity is separated from said second internal cavity, said first internal cavity is provided with a first channel, and said second internal cavity is provided with a second channel.

10. A method for manufacturing a closed turbocompressor impeller with a hub and a shroud by additive manufacturing, wherein this method comprises a step of:
    providing one or more internal cavities in the hub and/or the shroud by additive manufacturing, wherein a first internal cavity is brought in fluid communication with a back part of the impeller, or with an inlet of the impeller, or with an arbitrary location in the impeller channels that extend between the blades, and a second internal cavity is brought in fluid communication with the inlet of the impeller, and
    forming a sloping top wall on the first internal cavity with respect to a central axis of the impeller, wherein said sloping top wall forms a bottom portion of an outer surface of the hub and extends from a top portion of the outer surface of the hub towards a sealing surface for a back seal provided at a back side of the closed turbocompressor impeller, wherein said top portion and the bottom portion of the outer surface of the hub are configured to be exposed to the outlet pressure during operation.

11. The method according to claim 10, wherein the impeller is constructed in layers, whereby the method further comprises the steps of:
    manufacturing the impeller whereby an intermediate support lattice is incorporated between the shroud and the hub;
    removing of excess metal powder; and
    removing of the intermediate lattice support structure.

12. The method according to claim 11, wherein the method further comprises the step of processing the impeller on its outer surface.

* * * * *